United States Patent
Johnson

(10) Patent No.: US 12,248,076 B2
(45) Date of Patent: Mar. 11, 2025

(54) SCHEIMPFLUG CORRELATION LIDAR

(71) Applicant: Michigan Aerospace Corporation, Ypsilanti, MI (US)

(72) Inventor: Will Johnson, Saline, MI (US)

(73) Assignee: MICHIGAN AEROSPACE CORPORATION, Ypsilanti, MI (US)

( * ) Notice: Subject to any disclaimer, the term of this patent is extended or adjusted under 35 U.S.C. 154(b) by 653 days.

(21) Appl. No.: 17/628,982

(22) PCT Filed: Jul. 24, 2020

(86) PCT No.: PCT/US2020/043498
§ 371 (c)(1),
(2) Date: Jan. 21, 2022

(87) PCT Pub. No.: WO2021/016561
PCT Pub. Date: Jan. 28, 2021

(65) Prior Publication Data
US 2022/0260723 A1   Aug. 18, 2022

Related U.S. Application Data

(60) Provisional application No. 62/878,205, filed on Jul. 24, 2019.

(51) Int. Cl.
*G01S 17/95* (2006.01)
*G01P 5/26* (2006.01)
*G01P 13/02* (2006.01)

(52) U.S. Cl.
CPC ........... *G01S 17/95* (2013.01); *G01P 5/26* (2013.01); *G01P 13/02* (2013.01)

(58) Field of Classification Search
None
See application file for complete search history.

(56) References Cited

U.S. PATENT DOCUMENTS

| | | | |
|---|---|---|---|
| 4,585,341 A | 4/1986 | Woodfield | |
| 4,715,707 A | 12/1987 | Reynolds et al. | |
| 6,313,454 B1 * | 11/2001 | Bos | G06V 20/56 250/208.1 |
| 8,427,649 B2 | 4/2013 | Hays et al. | |
| 2012/0050750 A1 * | 3/2012 | Hays | G01P 5/26 356/519 |
| 2012/0169053 A1 | 7/2012 | Tchoryk et al. | |
| 2012/0274937 A1 * | 11/2012 | Hays | G01S 17/95 356/450 |

(Continued)

OTHER PUBLICATIONS

Walker, Stephen. "Two-axes Scheimpflug focusing for particle image velocimetry." Measurement Science and Technology 13.1 (2001): 1. (Year: 2001).*

(Continued)

*Primary Examiner* — Luke D Ratcliffe
(74) *Attorney, Agent, or Firm* — Juan Carlos A. Marquez; Marquez IP Law Office, PLLC

(57) ABSTRACT

A system for determining the distance or range from a LIDAR device and the wind direction uses optics configured in the Scheimpflug condition to establish range from the LIDAR to the atmosphere being measured. This LIDAR embodiment uses correlation techniques to establish wind speed and direction. Multiple laser beam lines of sight are required to determine wind direction and speed.

11 Claims, 3 Drawing Sheets

(56) References Cited

U.S. PATENT DOCUMENTS

2014/0247441 A1    9/2014    Lacondemine et al.

OTHER PUBLICATIONS

Santos, Victor, et al. "Dual-band infrared Scheimpflug lidar reveals insect activity in a tropical cloud forest." Applied Spectroscopy 77.6 (2023): 593-602. (Year: 2023).*
Rydhmer, Klas, et al. "Automating insect monitoring using unsupervised near-infrared sensors." Scientific reports 12.1 (2022): 2603. (Year: 2022).*
PCT International Search Report and Written Opinion mailed Oct. 15, 2020 in counterpart PCT application PCT/US2020/043498, 8 pages.
European Extended Search Report mailed Jul. 11, 2023 in counterpart Euroeapn application EP20844218.6, 8 pages.

* cited by examiner

SCHEIMPFLUG CORRELATION LIDAR

This application is a national stage application filed under 35 U.S.C 371 of International Application No. PCT/US2020/043498 filed Jul. 24, 2020, which claims priority to U.S. Provisional Application No. 62/878,205 filed Jul. 24, 2019. The entire disclosures of the above applications are incorporated herein by reference in their entireties.

BACKGROUND OF INVENTION

A system and method of making simultaneous, or substantially simultaneous, measurements of wind speed and direction by using correlation techniques to measure velocity and optics in the Scheimpflug condition to establish range are disclosed.

SUMMARY OF PRIOR ART

LIDAR (Light Detection And Ranging) systems are used to measure how atmospheric aerosols move. Some LIDAR systems measure the Doppler shift produced by analyzing the laser beam reflected from atmospheric aerosol particles as the aerosols are moved about by the wind.

The Doppler measurement is limited to a vector along the LIDAR's line of sight. By employing multiple lines of sight and combining the Doppler information from multiple look angles, the three-dimensional wind vector can be produced. LIDAR time of flight measurements provide range to the target and the LIDAR look direction provides the directional information relative to the system.

In addition to Doppler, there is another technique that uses correlation between different lines of sight to measure wind perpendicular to the laser beams. Atmospheric aerosols are not very uniform and can be characterized as being spatially heterogeneous. As the aerosols move from one laser's line of sight to another, the intensity changes as these heterogeneities move from one laser beam to another, and the heterogeneities can be tracked by making correlation measurements between the different lines of sight. The range measurement conventionally is made with time of flight information.

SUMMARY OF THE INVENTION

As more fully described below, and in accordance with at least one embodiment, the invention is directed to a system for determining the distance or range from the LIDAR and the wind direction. This LIDAR uses optics configured in the Scheimpflug condition to establish range from the LIDAR to the atmosphere being measured. While previous LIDAR systems have incorporated the Scheimpflug condition to establish range to the measured volume (Michigan Aerospace U.S. Pat. No. 8,427,649), this LIDAR embodiment uses correlation techniques to establish wind speed and direction. Multiple laser beam lines of sight are required to determine wind direction and speed.

BRIEF DESCRIPTION OF THE DRAWINGS

The present invention is illustrated in the accompanying drawings, wherein.

DESCRIPTION OF THE PREFERRED EMBODIMENT

Figure 1:
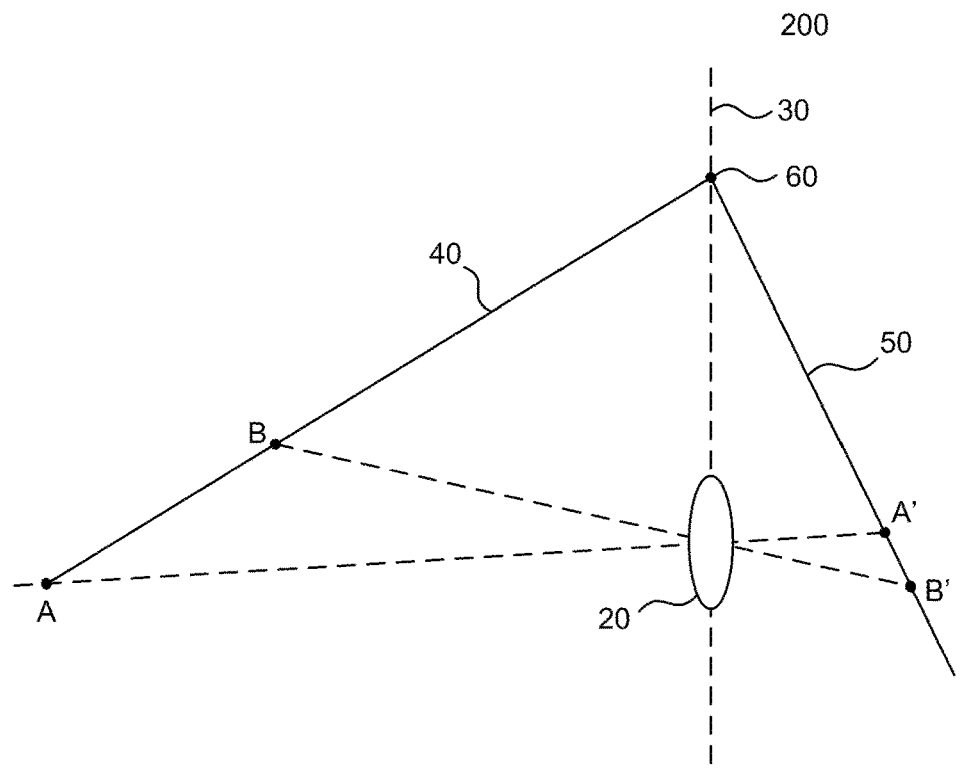
FIG. 1 illustrates the Scheimpflug condition as applied to the present invention.

The embodiments of the present invention will be described hereinbelow in conjunction with the above-described drawings. FIG. 1 shows a perspective view illustrating the general operation of the imaging lens 20, imaging lens plane 30, image plane 50 and object plane 40 in the Scheimpflug condition when both the object plane 40 and image plane 50 are tilted with respect to the imaging lens plane 30, as applicable to the present invention. As illustrated, if considered in three dimensions, the three planes represented in FIG. 1 would extend out of the page. In the Scheimpflug condition, the image plane 50 is in focus along the object plane 40. The object plane portion from A to B in FIG. 1 correspond to locations A' and B' in the image plane 50. The lens plane 30, object plane 40 and image plane 50 intersect at a common line 60 that extends out of the page.

Figure 2:
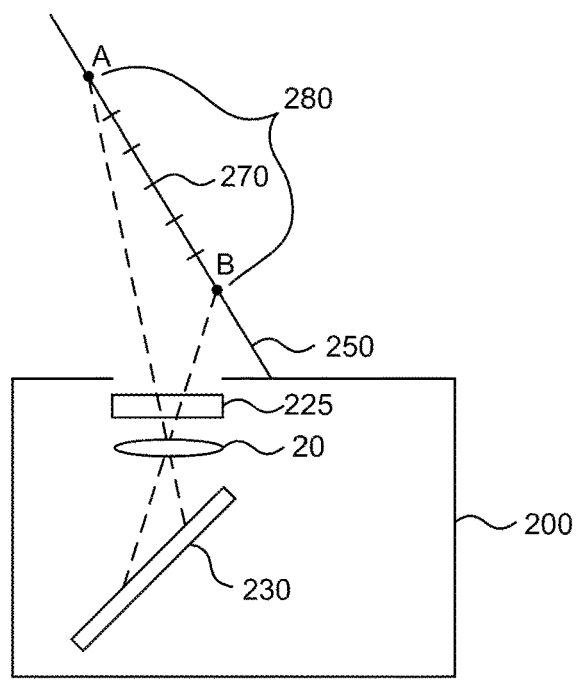
FIG. 2 shows how the Scheimpflug condition illustrated in FIG. 1 is implemented in accordance with Scheimpflug LIDAR system.

FIG. 2 shows how the Scheimpflug condition illustrated in FIG. 1 is implemented with the imaging lens 20 and a laser beam 250 in what is often called a Scheimpflug LIDAR or a Scheimpflug Correlation LIDAR. In a Scheimpflug LIDAR 200, the laser beam 250 lies in the object plane 40 and a linear detector array 230 lies in the image plane 50 between points A' and B' (referring back to FIG. 1). The linear detector array 230 may be implemented using any device known in the art, such as a CCD or an imaging detector, that includes a plurality of detector elements or equivalent. For example, the linear detector array may be implemented using a detector device having an array of detector elements that can be electronically controlled to be divided into a plurality of sub-arrays; each sub-array would constitute a single detector element.

Each element in the detector array 230 is configured to view a different portion of the laser beam 250 as illustrated by the hash marks 270 along the laser beam 250 in FIG. 2. The letters A and B indicate the extent of the field of view 280 of the linear array 230 in the object plane. A optical bandpass filter 225 is positioned in front of the imaging lens 20 and the detector array 230. The bandpass filter is intended to reduce the background illumination and improves the signal to noise ratio.

Instead of using time of flight to determine the location along the laser beam or object plane 40, the Scheimpflug condition defines the distance along the laser beam 250. Therefore, the detector 230 does not require the large bandwidth of a time of flight system to resolve range. The Scheimpflug LIDAR may use a CW laser and because it does not use Doppler to determine speed, the laser does not need to meet the challenging coherence requirements of a Doppler based system.

Figure 3:
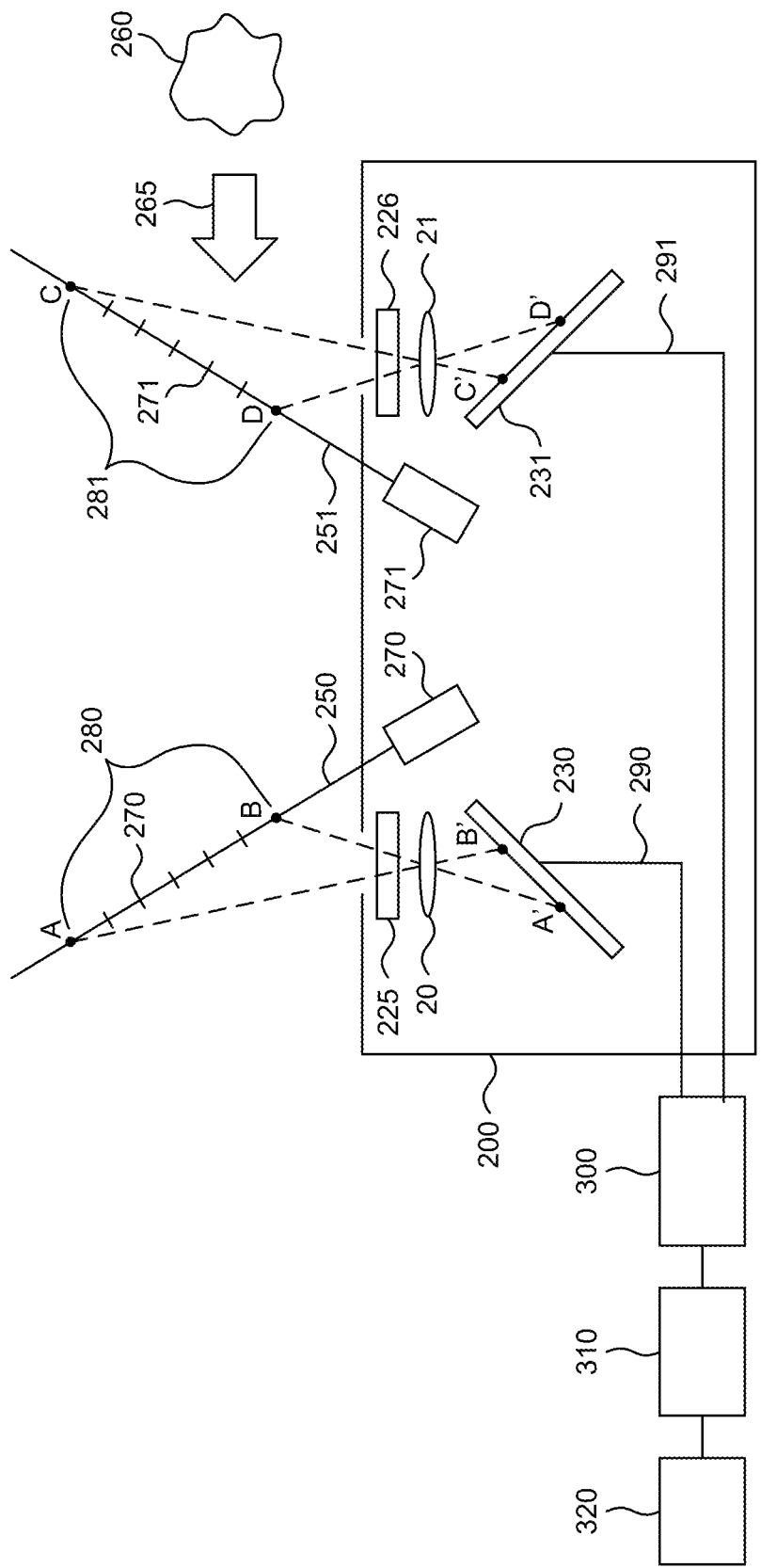
FIG. 3 illustrates an implementation of at least a preferred embodiment of the present invention using two laser beams.

FIG. 3 shows a preferred embodiment according to the present invention, wherein two laser beams 250 and 251 are used in implementing the Scheimpflug LIDAR system for observing a region of higher aerosol concentration 260 moving in the direction indicated by the arrow 265. The preferred embodiment of the present invention requires at least two laser beams 250, and 251 pointed in different directions and the separation between beams increases with distance from the LIDAR 200 as shown in FIG. 3, along with corresponding linear detector arrays 230 and 231 positioned to view the scattered light from corresponding laser beams 250 and 251, respectively. While two lasers 270 and 271 are shown in the preferred embodiment, an alternative embodiment could be configured to use a single laser and split the beam into two beams using a beam splitter. The linear detector arrays 230 and 231 produce output signals 290 and 291, respectively, that are directed to the digitizer/frame buffer 300.

The digitizer/frame buffer 300 may be implemented only as a frame buffer depending upon the type of linear detector array selected. Some linear array detectors will have the digitization function integrated into the linear detector array; if that type of device is used, the digitizer/frame buffer 300 will only provide a frame buffer function. The frame buffer output goes to the processor 310 where the signals for each detector element in the linear detector arrays 230 and 231 will be converted to time series data that can be graphically represented in an intensity versus time format. These time series data will then be cross correlated as described below for the detector pairs that are selected for processing. The cross correlation will be output to the data archive and user interface 320. For example, given a concentration of aerosols 260 (say a puff of smoke) that is moving in the direction of the large arrow 265, as the concentration of aerosols increases, the aerosol scattering will increase resulting in an increase in the aerosol scattering signal level.

Figure 4A:
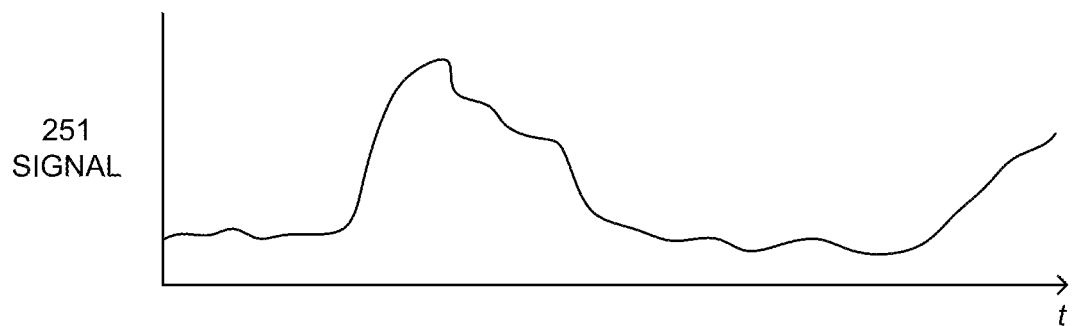
FIGS. 4A and 4B show a pair of plots of the LIDAR signal using two laser beams according to the present invention.
Figure 4B:
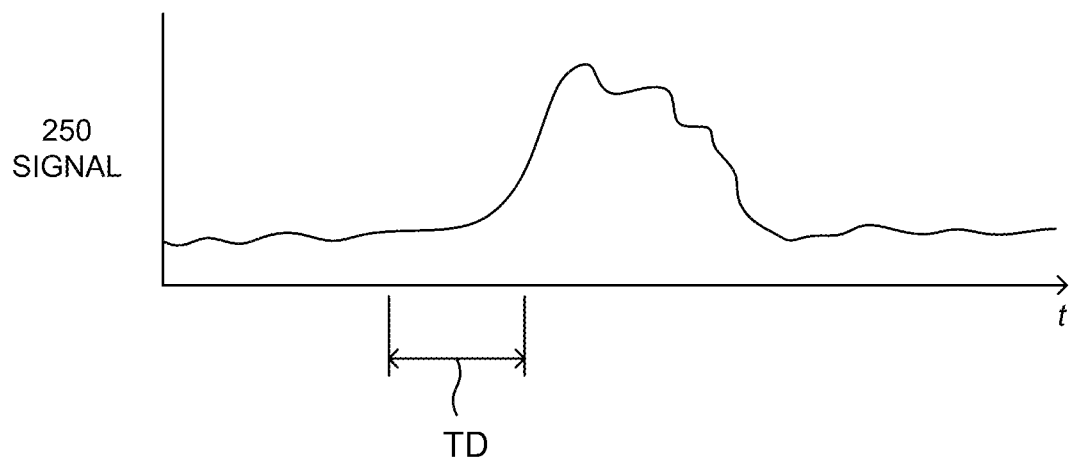

FIGS. 4A and 4B show plots of a simulated signal from two laser beams for a given range in the case where the wind is in the plane of the beams. In particular, FIGS. 4A and 4B show a pair of plots representing the signals from the LIDAR 200 resulting from the two laser beams 250 and 251 and selected detector elements from the linear detector arrays 230 and 231 that correspond to a given range. In other words, the detector elements selected from the linear detector arrays 230 and 231 are the ones that are positioned to view the corresponding positions or ranges of their respective laser beams 250 and 251. The plot of FIG. 4A shows the increased signal level 251 SIGNAL resulting from the increased concentration of aerosols encountering laser beam 251. As time progresses, the signal level increases and then decreases. The plot of FIG. 4B shows signal 250 SIGNAL from the aerosols interacting with the second laser beam 250. Note that the two signal levels are not exactly alike as atmospheric turbulence will cause the aerosol concentration to change with time and location.

Cross correlation calculations based on the formulas hereinbelow between the two signals with a known sample rate gives the amount of time it takes for the aerosol concentration to pass by both beams. The letter h is the height or range from the LIDAR to the area viewed by the LIDAR. Time is identified as the letter t and the wind velocity is represented by the letter V.

$$\text{time delay} @ h = \max[Sig_1(r, t) * Sig_2(r, t)]_{r_h}$$

$$\frac{\partial}{\partial \tau}\left[\int_{-\infty}^{\infty} Sig_1(r, t) * Sig_2(r, t+\tau)dt\right]_{\tau_h} = 0$$

$$V_{wind_h} = \frac{\text{beam separation} @ h}{\text{time delay} @ h}$$

Since the geometry or range is known from the design, the speed is obtained by dividing the distance between the two laser beams by the correlation time. As shown in FIG. 4B, the section TD on the plot represents the time difference or time delay that then is used to determine the speed.

In the above discussion, the cross correlation was calculated between two detectors corresponding to a given range, but cross correlations may be calculated between signals from any pair of the detector elements in the linear detector arrays 230 and 231. FIG. 3, as an example, shows the aerosol moving nearly perpendicular to the laser beam. Thus, it is possible to measure movement along the laser beam by using pairs of detectors along a laser's propagation direction.

While only two laser beams are shown in the above discussion of the preferred embodiment, additional laser beams may be used to refine the measurement of wind speed and direction. For example, a third laser beam directed out of the plane defined by any two lasers would provide information that would allow one to measure the three dimensional wind vector.

Cross correlation between two or more signals can also be analyzed using machine learning methods. By training the system with truth data, machine learning algorithm can predict and/or supplement the measurement of wind speed and direction.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims unless they depart therefrom.

The invention claimed is:

1. A system for determining wind speed and direction that measures transverse and parallel components of a wind vector relative to coherent energy propagation, comprising:
   a plurality of emitters arranged to emit coherent energy in a direction substantially transverse to a direction of wind to be measured;
   at least one linear detection array operatively positioned relative to the plurality of emitters such that images from the plurality of emitters are in focus along the at least one linear detection array in accordance with the Scheimpflug condition;
   a computing circuit configured to process data signals from the at least one linear detection array, the computing circuit being further configured to analyze the data signals from the at least one linear detection array so as to identify a time difference to overlap between data signals resulting from each of the plurality of emitters.

2. A system for determining wind speed and direction that measures transverse and parallel components of the wind vector relative to the laser beams propagation according to claim 1, wherein the at least one linear detection array is an imaging detector.

3. A system for determining wind speed and direction that measures transverse and parallel components of the wind vector relative to the laser beams propagation according to claim 1, wherein the computing circuit is configured to analyze the data signals from the at least one linear detection array
   Via cross-correlation so as to identify the time difference to overlap between data signals resulting from each of the plurality of emitters.

4. A system for determining wind speed and direction that measures transverse and parallel components of the wind vector relative to the laser beams propagation according to claim 1, further comprising:

a plurality of linear detection arrays operatively positioned relative to the plurality of emitters such that images from the plurality of emitters are correspondingly in focus along the plurality of linear detection arrays in accordance with the Scheimpflug condition.

5. A system for determining wind speed and direction that measures transverse and parallel components of the wind vector relative to the laser beams propagation according to claim 1, wherein the computing circuit includes a frame buffer, a processor for generating cross correlated time series data, and a data archive and user interface for receiving the displaying the cross correlated time series data.

6. A system for determining wind speed and direction that measures transverse and parallel components of the wind vector relative to the laser beams propagation according to claim 1, wherein processor of the computing circuit is configured to cross-correlate the data signals from the at least one linear detection array so as to identify the time difference to overlap between data signals resulting from each of the plurality of emitters.

7. A method for determining wind speed and direction that measures transverse and parallel components of a wind vector relative to coherent energy propagation, comprising the steps of:

arranging a plurality of emitters to emit coherent energy in a direction substantially transverse to a direction of wind to be measured;

positioning at least one linear detection array relative to the plurality of emitters such that images from the plurality of emitters are in focus along the at least one linear detection array in accordance with the Scheimpflug condition;

processing data signals from the at least one linear detection array to generate time series data;

analyzing the data signals from the at least one linear detection array so as to identify a time difference to overlap between data signals resulting from each of the plurality of emitters.

8. A method for determining wind speed and direction that measures transverse and parallel components of the wind vector relative to the laser beams propagation according to claim 7, wherein the step of analyzing the data signals from the at least one linear detection array via cross-correlation so as to identify the time difference to overlap between data signals resulting from each of the plurality of emitters.

9. A method for determining wind speed and direction that measures transverse and parallel components of the wind vector relative to the laser beams propagation according to claim 1, further comprising:

positioning a plurality of linear detection arrays operatively positioned relative to the plurality of emitters such that images from the plurality of emitters are correspondingly in focus along the plurality of linear detection arrays in accordance with the Scheimpflug condition.

10. A system for determining wind speed and direction that measures transverse and parallel components of the wind vector relative to the laser beams propagation according to claim 1, wherein the computing circuit is configured to analyze the data signals from the at least one linear detection array by means of machine learning so as to identify the time difference to overlap between data signals resulting from each of the plurality of emitters.

11. A method for determining wind speed and direction that measures transverse and parallel components of the wind vector relative to the laser beams propagation according to claim 8, wherein the step of analyzing the data signals from the at least one linear detection array by means of machine learning so as to identify the time difference to overlap between data signals resulting from each of the plurality of emitters.

* * * * *